Nov. 25, 1930.  W. L. MONRO  1,782,972
METHOD AND APPARATUS FOR MAKING SHEET GLASS
Filed Feb. 16, 1924   5 Sheets-Sheet 1

INVENTOR
William L. Monro

Nov. 25, 1930.  W. L. MONRO  1,782,972
METHOD AND APPARATUS FOR MAKING SHEET GLASS
Filed Feb. 16, 1924  5 Sheets-Sheet 2
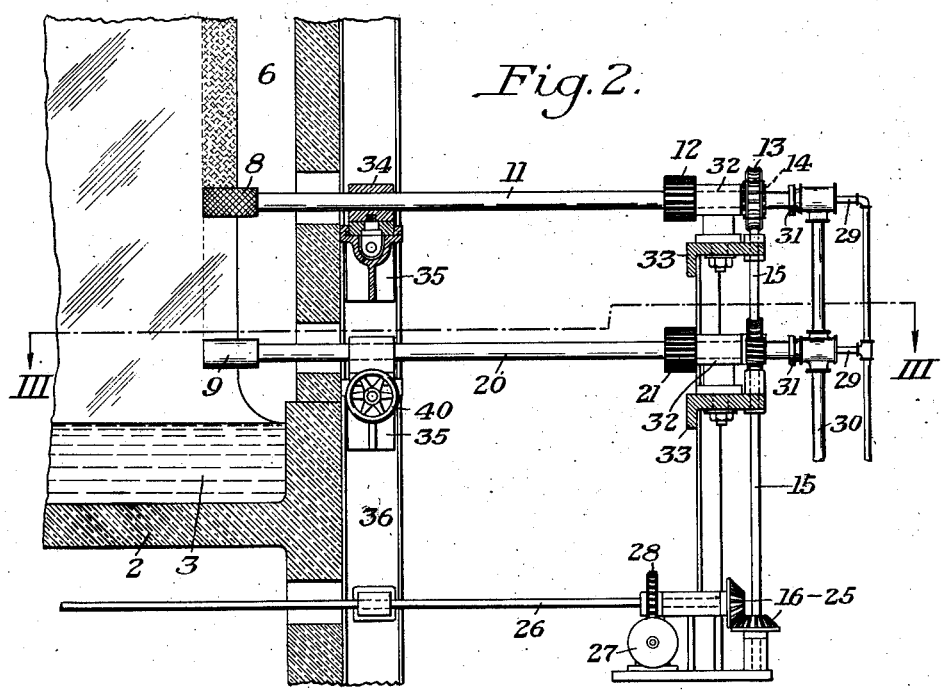
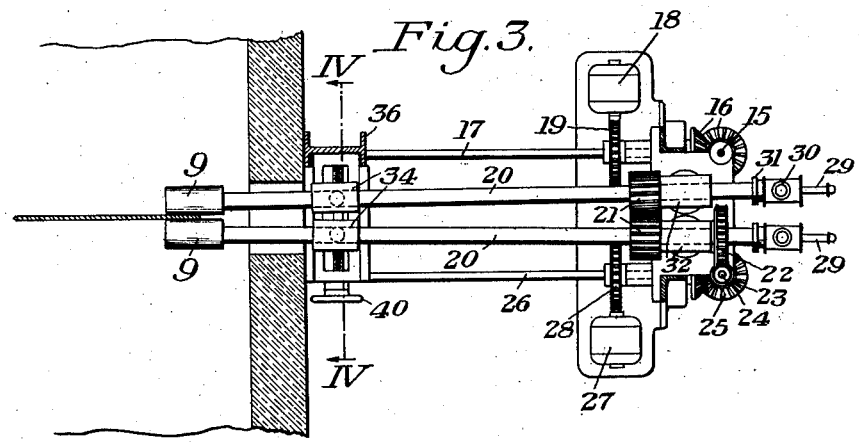
INVENTOR
William L. Monro
By Byrnes, Stebbins & Parmelee
His Attys Nov. 25, 1930.                    W. L. MONRO                    1,782,972
                  METHOD AND APPARATUS FOR MAKING SHEET GLASS
                      Filed Feb. 16, 1924      5 Sheets-Sheet 3
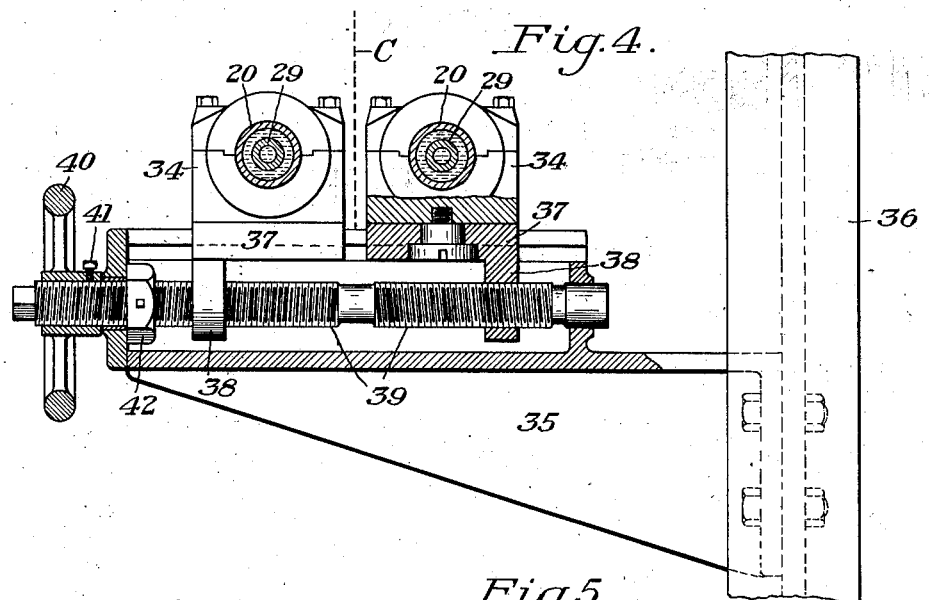
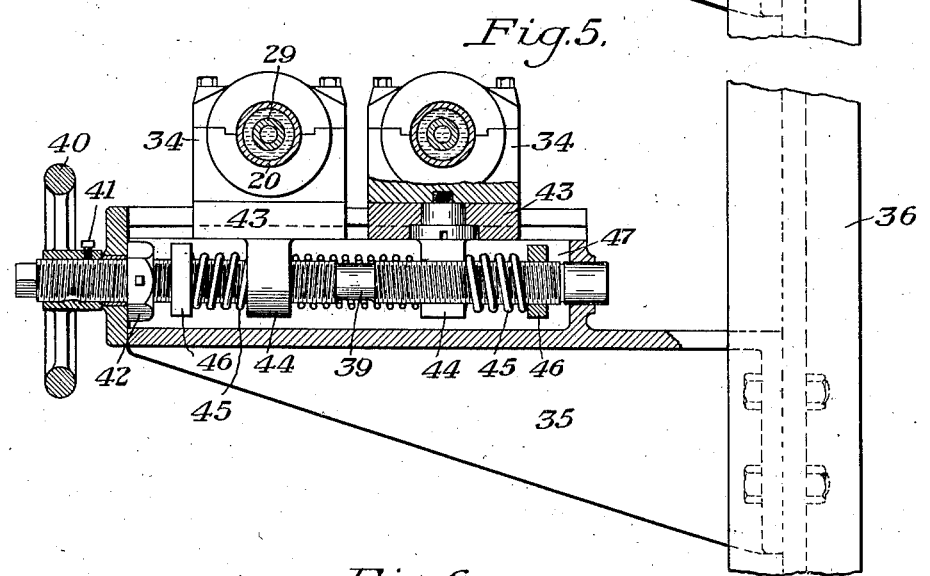
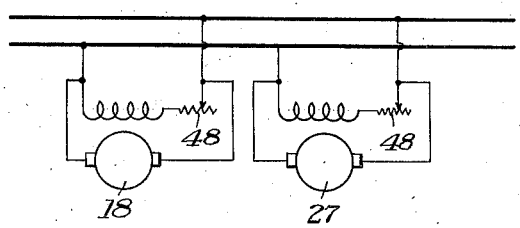
INVENTOR Nov. 25, 1930. W. L. MONRO 1,782,972
METHOD AND APPARATUS FOR MAKING SHEET GLASS
Filed Feb. 16, 1924 5 Sheets-Sheet 4
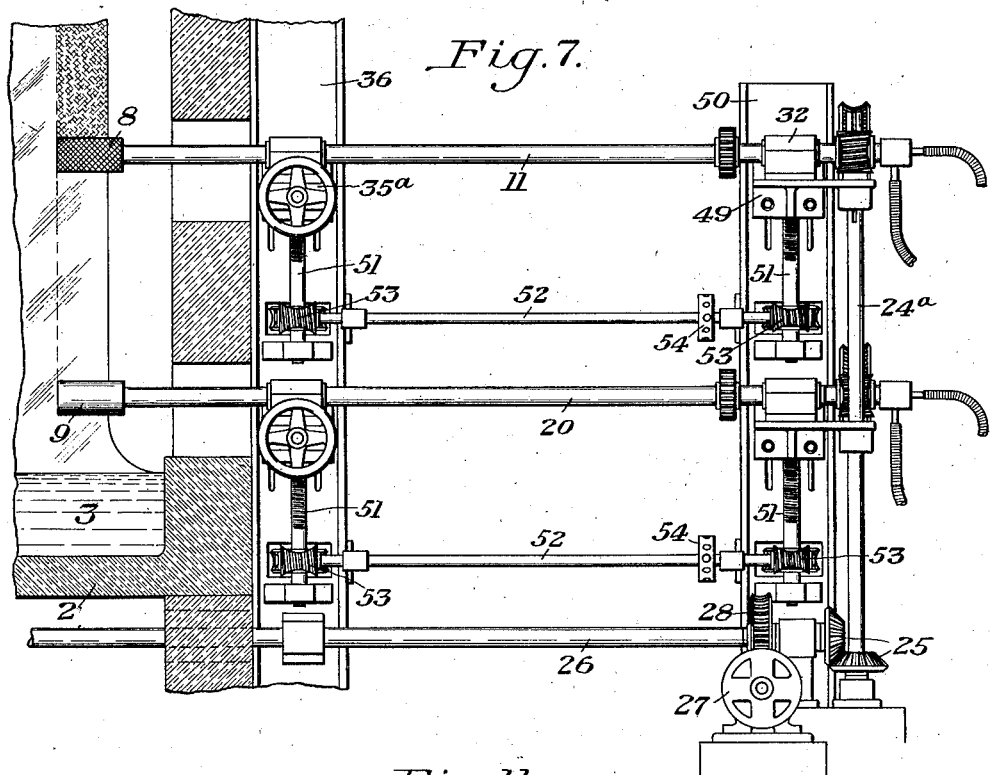
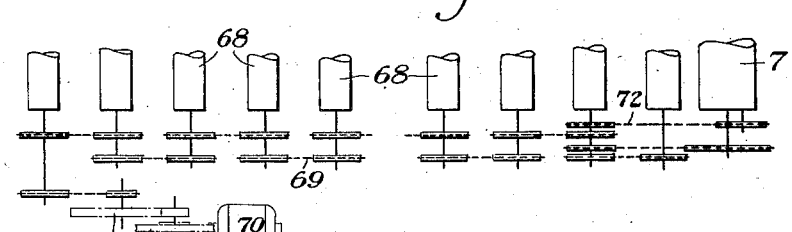
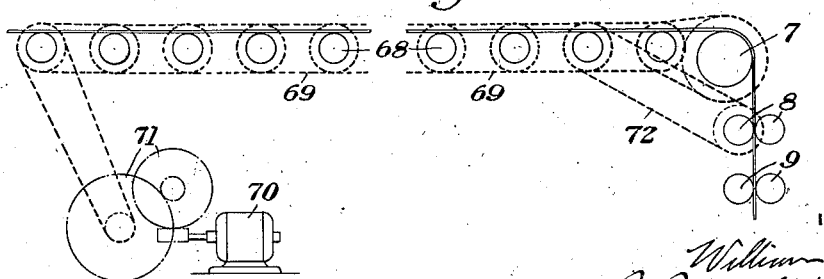

Nov. 25, 1930.  W. L. MONRO  1,782,972
METHOD AND APPARATUS FOR MAKING SHEET GLASS
Filed Feb. 16, 1924  5 Sheets-Sheet 5
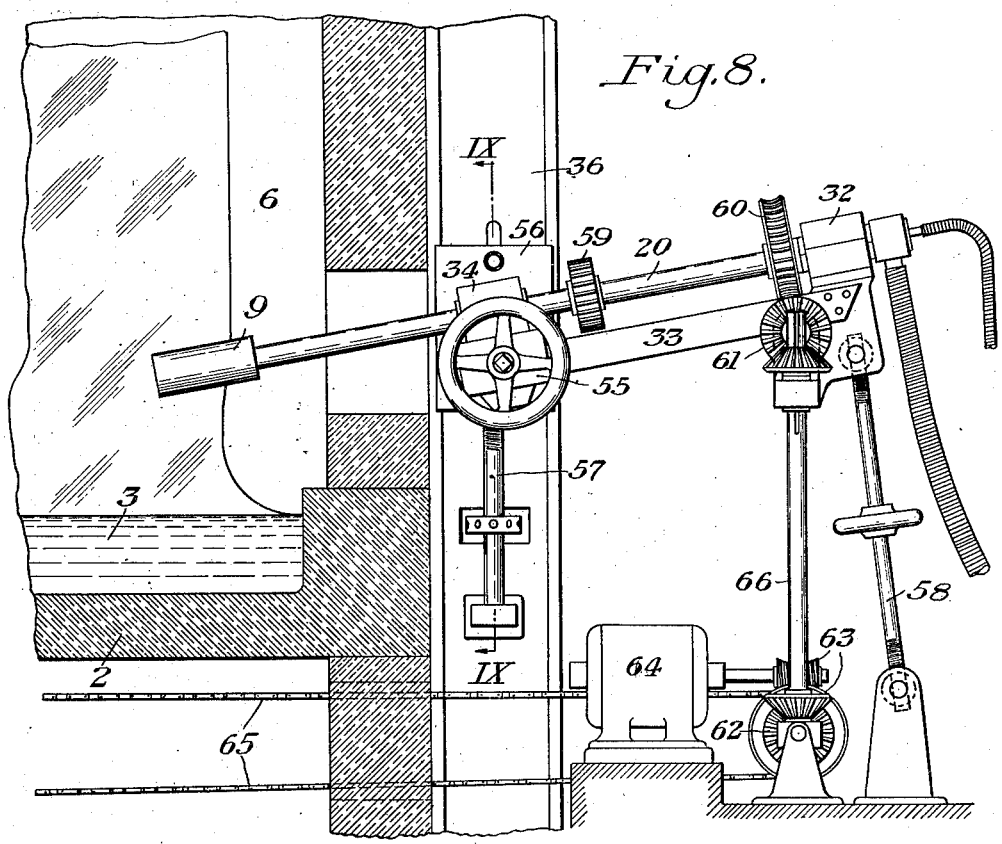
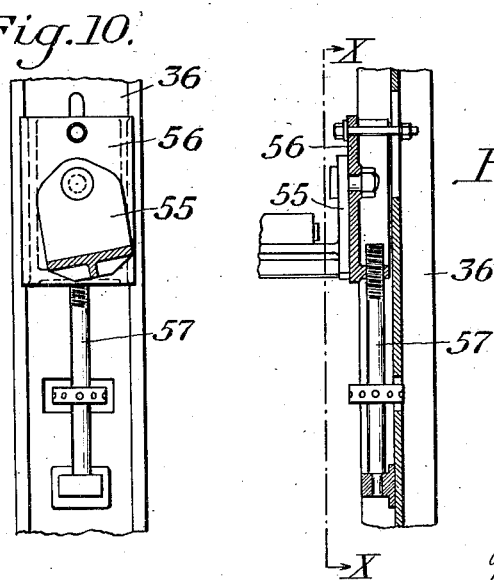
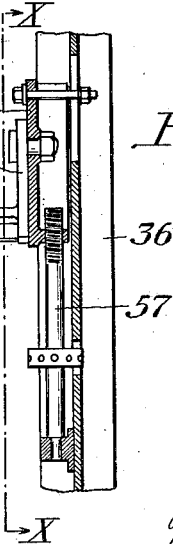
INVENTOR Patented Nov. 25, 1930

1,782,972

UNITED STATES PATENT OFFICE

WILLIAM L. MONRO, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY

METHOD AND APPARATUS FOR MAKING SHEET GLASS

Application filed February 16, 1924. Serial No. 693,235.

This invention relates to a method and apparatus for making sheet glass, and is particularly applicable to those processes wherein a glass sheet is drawn upwardly from a molten bath and over a bending roll, although it is also applicable to glass drawing apparatus wherein the drawn sheet continues in an upward direction.

In the drawing of sheet glass, it is desirable to retard the upward travel of the edge portions of the sheet in order to secure a smooth and unwrinkled sheet of glass. I preferably accomplish this by gripping the opposite edge portions between a pair of rolls and positively rotating these rolls in a reverse direction to that of the travel of the glass.

If a bending roll is used, it is desirable to reduce the load thereon as greatly as possible in order to prevent marking of the glass, and I preferably provide means below the bending roll for drawing the sheet upwardly; as for example, by a pair of positively driven knurled rolls between the bending roll and the smooth rolls for gripping each edge portion of the rising sheet and drawing it upwardly. I thus secure in a large measure the upward force required to draw the sheet, and correspondingly reduce the pressure between the plastic glass and the bending roll as it passes thereover.

After the glass has left the bending roll it is desirable to continue the stretching action and I therefore provide a plurality of spaced rollers for supporting and advancing the drawn sheet. These rollers are positively driven at a peripheral speed slightly higher than the peripheral speed of the bending roll and they serve to further stretch the glass and insure a flat product.

In the accompanying drawings, which illustrate the present preferred embodiment of my invention—

Figure 2 is a partial vertical section, on the line II—II of Figure 1;

Figure 3 is a horizontal section, partly broken away, on the line III—III of Figure 2;

Figure 4 is a section to an enlarged scale on the line IV—IV of Figure 3;

Figure 5 is a view similar to Figure 4, but showing a slightly modified form of apparatus;

Figure 6 is a wiring diagram of the apparatus;

Figure 7 is a view similar to Figure 2, but showing a modified form of apparatus;

Figure 8 is a similar view but showing another modification wherein the second set of edge rolls is omitted;

Figure 9 is a vertical section, partly broken away, on the line IX—IX of Figure 8;

Figure 10 is a vertical section on the line X—X of Figure 9; and

Figures 11 and 12 are diagrammatic views showing one manner of driving the apparatus.

Figure 1:
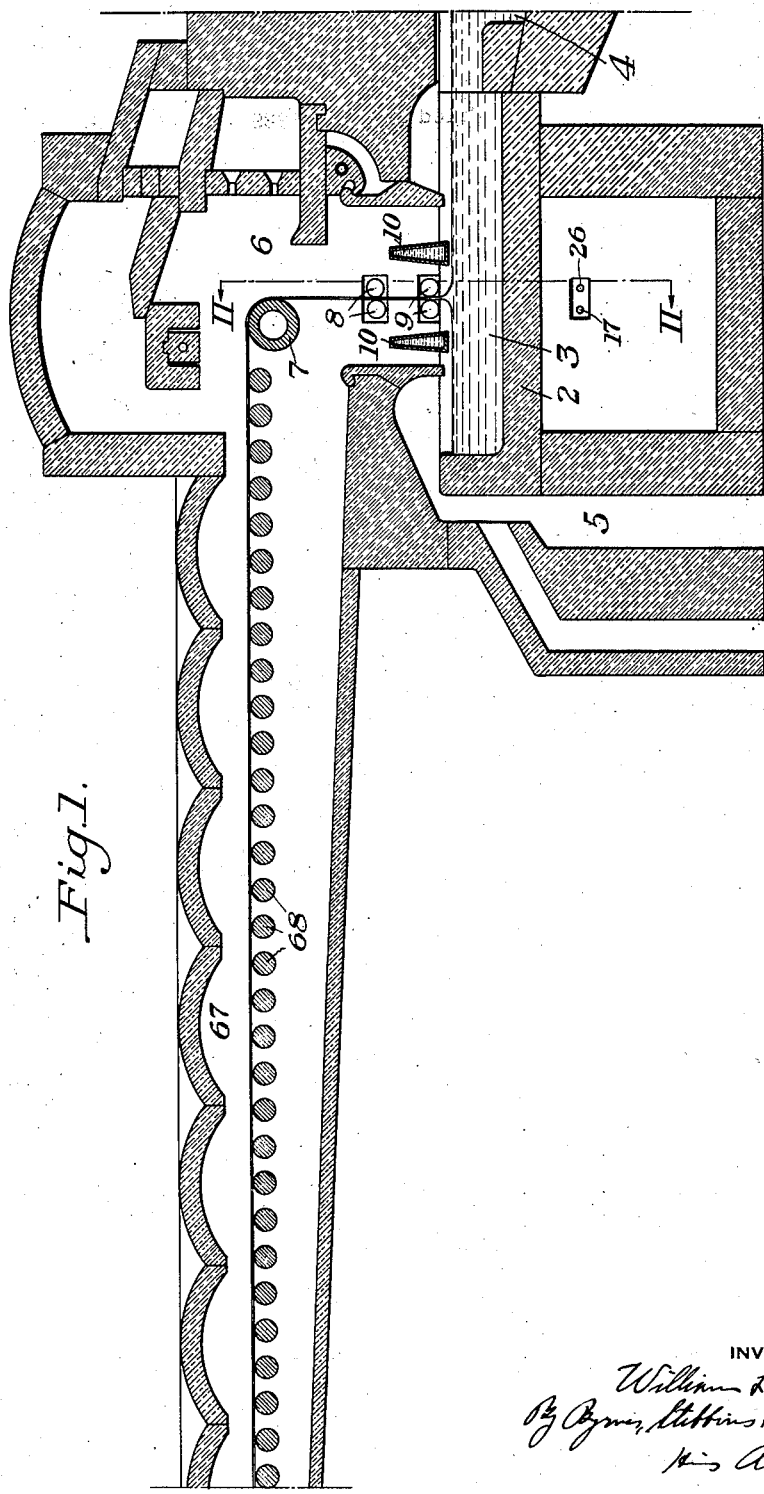
Figure 1 is a vertical longitudinal section through a glass drawing apparatus and a portion of a connected leer tunnel embodying my invention.

In the embodiment of the invention illustrated in Figures 1 to 4 inclusive, there is shown a receptacle 2 adapted to hold a bath of molten glass 3 which is continuously supplied from a connected tank 4. The bath 3 receives heat from the tank 4 and also from a gas tunnel 5 from which hot gases are directed downwardly on the portion of the bath remote from the tank.

Above the bath is a drawing chamber 6 in which is mounted a bending roll 7 extending the width of the drawing chamber. Below the bending roll 7 and at each side of the chamber 6 are two superposed pairs of edge rolls 8 and 9. Coolers 10 of suitable construction are also preferably provided for regulating the working temperature.

The upper lifting edge rolls 8 are preferably knurled or otherwise roughened to securely grip the edge of the rising sheet. They are each connected to a hollow shaft 11 extending upwardly from the chamber 6 and geared together by suitable gears 12. One of the shafts 11 is supplied with a worm wheel 13 meshing with a worm 14 carried by a vertical shaft 15. The shaft 15 is connected by bevel gears 16 to a horizontal shaft 17 which extends under the bath 3 and makes a similar connection on the other side so that the rolls on each side will be driven at the same speed. The motor 18 is connected to the shaft 17 by a worm drive 19 and drives the rolls 8 at suitable speed.

The apparatus for driving the edge rolls 9, which are preferably smooth faced, is the same as for the rolls 8, there being provided outwardly extending hollow shafts 20 connected by gears 21, one of the shafts 20 being provided with a worm wheel 22 driven by a worm 23 on a vertical shaft 24. The shaft 24 is connected by bevel gears 25 to a horizontal shaft 26 extending to the other side of the apparatus and connected to a similar drive for the edge rolls on the other side of the sheet. The shaft 26 is driven by a motor 27 connected to the shaft by worm gearing 28.

Suitable water cooling is provided for the edge rolls, there being preferably provided inlet pipes 29 extending through the hollow shafts 11 and 20 and terminating inside the rolls 8 and 9. Cooling water is introduced through these pipes and finds its way back through the shafts 11 and 20, and thence to a discharge line 30. Suitable packings 31 are provided at the outer ends of the shafts 11 and 20.

The shafts 11 and 20 are supported near their outer ends by bearings 32 which are pivotally connected to a frame 33 and are supported at their inner ends by bearings 34 supported on brackets 35 secured to a buckstay 36 of the drawing chamber. As best shown in Figure 4, each bearing 34 is pivotally mounted on a slide 37 carried by the bracket 35 and having an integral nut 38 engaged by a screw 39. The screw 39 is provided with right and left hand threads and also with a handwheel 40. By turning the handwheel the bearings 34 may be moved toward or away from one another, thus determining the spacing between the edge rolls. The center line of the rising sheet of glass is indicated by a dotted line C on Figure 4 and obviously its position will not be affected by the usual adjustment of the handwheel 40. If, however, it is desired to shift the position of both rollers together, a set screw 41 on the handwheel is loosened and the handwheel itself is turned one way or another on the screw shaft 39. A nut 42 on the inside of the bracket 35 is similarly adjusted and the screw shaft 39 is thus axially shifted as a whole and carries with it the bearings 34 and their corresponding shafts.

Figure 5 shows a slightly modified form of apparatus wherein the bearings 34 are mounted on slides 43 having forks 44 extending downwardly around the screw shaft 39. These forks are not threaded but engage compression springs 45 which bear against nuts 46. The nuts 46 are square in cross section and bear against the sides of the recess 47 in which they and the screw shaft 39 are mounted. Consequently, as the handwheel 40 is turned, the sides of the recess 47 hold the nuts against rotation and they are moved along the shaft. This serves to move the edge rolls toward one another as in the embodiment of Figure 4, except that the force is applied through the springs 45, thus supplying a yielding force for the edge rolls.

In operation the apparatus is started up in the usual way and the edge rolls 8 and 9 grip the rising sheet. The edge rolls 8 are effective for pulling the thick edges of the sheet upwardly while the rolls 9 slidably engage the sheet edges and exert a downward pull thereon. This downward pull stretches the sheet and removes all wrinkles therefrom, resulting in a smooth product; while the upper rolls 8 reduce the pressure between the rising glass sheet and the bending roll 7, thus obviating bending roll defects from the product. Rheostats 48 are preferably provided for each of the motors 18 and 27 so the relative speeds of the two sets of rolls may be controlled as desired.

As shown in Figure 3, the shafts 20 preferably converge slightly toward the edge rolls when they are spaced correctly to grip the sheet edge, as this construction materially aids in maintaining the width of the sheet and also enhances the stretching effect.

Figure 7 shows a modified form of apparatus in which the brackets 35$^a$ are slidably mounted on the buckstay 36 while the bearings 32 are carried on brackets 49 slidably mounted on frame members 50. Jack screws 51 are provided for raising and lowering the brackets 35$^a$ and 49 and these screws are connected together by a shaft 52 and worm gearing 53. A capstan head 54 is provided on the shaft 52 for turning the same and raising the bending rolls in the desired amount. In this embodiment of the invention the vertical shafts 15$^a$ and 24$^a$ are splined and the worms for driving the shafts 11 and 20 are slidably mounted thereon. With this form of apparatus the vertical position of the edge rolls may be adjusted as desired.

Figure 8 shows another form of apparatus in which the knurled edge rolls are done away with entirely, the lifting force being supplied entirely through the bending roll 7. In this embodiment of the invention an additional adjustment is provided in that the bearings 34 are mounted on a bracket 55 pivotally secured to a slidable block 56 fastened to the buckstay 36. A jack screw 57 is provided for regulating the vertical position of the block 56 and the outer bearing 32 is mounted on a frame 33 secured to the pivoted bracket 55 and supported by a jack screw 58. The shafts 20 are connected by gears 59 and are driven through worm gearing 60, bevel gears 61 and 62 and worm gearing 63 connected to a motor 64. A chain drive 65 is provided for carrying the drive to the other side of the drawing chamber 6 and driving the rolls on the other side of the sheet. As will be seen in Figure 8, the drive from the bevel gearing 61 to the bevel gearing 62 is effected through a shaft 66 having pivotally mounted bearings so the drive is not affected by adjustments of the jack screws 57 and 58. With this apparatus the vertical position of the rolls 9 and also their inclination may be adjusted as desired to secure the desired side pull or stretching effect on the glass sheet. It will be understood that this form of apparatus may be used alone or in connection with knurled rolls as desired.

When the plastic sheet passes over the bending roll it is directed into a horizontally extending leer tunnel 67 and supported therein by a plurality of closely spaced rolls 68. These rolls are all connected by chain drives 69 and driven by a motor 70 through suitable gearing 71. If desired, the edge rolls 8 may be connected to the leer roll drive by a chain and sprocket connection 72 and even the smooth rolls 9 may be so connected if desired, although it will be generally found preferable to provide a separate drive for these. The size of the chain sprockets should be such that the peripheral speed of the leer rolls is a little greater than that of the bending roll. The initial flattening of the sheet is accomplished by the action of the rolls 9 but after the plastic sheet passes over the bending roll 7, there may be still a certain amount of wave therein. This is removed by the action of the rolls 68 which tend to stretch the glass sheet and remove all wrinkles and waves therefrom.

It will be seen that I provide for drawing sheet glass and removing the usual wrinkles and waves therefrom by slidably engaging the edge portions of the rising sheet to resist the upward movement of the glass. The flatness of the product is also enhanced by the action of the leer rolls which tend to stretch the sheet and remove any wrinkles still remaining therein.

While I have shown the preferred form of my invention with certain modifications thereof, it will be understood that the invention is not limited thereto but may be otherwise embodied. For example, the plane of rollers in the leer tunnel may be inclined so the weight of the glass tends to keep it free from wrinkles, certain of the rolls may be driven at one speed and some at another, or some of the rolls may be left as idlers. The knurled rolls may be placed at an angle to the horizontal, the resistant edge rolls may be applied to the process of vertically drawing glass, and the invention may take various other forms, within the scope of the following claims.

I claim:

1. In the method of making sheet glass, the steps consisting in drawing a sheet of glass upwardly from a molten bath and then carrying it over a bending roll, engaging the edge portions of the sheet below the bending roll and drawing the edge portions of the sheet upwardly, and frictionally applying a downward force to the edge portions of the sheet below such point of engagement to resist the upward movement of the glass and stretch the sheet, substantially as described.

2. In the method of making sheet glass, the steps consisting in drawing a glass sheet upwardly from a molten bath, passing it over a bending roll while it is still in a plastic condition, supporting the sheet beyond the bending roll on roll supports and stretching the sheet by driving the rollers at a higher peripheral speed than that of the bending roll, substantially as described.

3. In the method of making sheet glass, the steps consisting in drawing a glass sheet upwardly from a molten bath, slidably engaging the edge portions of the rising sheet to resist the upward movement of the glass and stretch the sheet, passing it over a bending roll while it is still in a plastic condition, supporting the sheet beyond the bending roll on roll supports, and further stretching the sheet by driving the rollers at a higher peripheral speed than that of the bending roll, substantially as described.

4. Sheet glass drawing apparatus, including a molten bath, means for drawing a sheet of glass upwardly therefrom, pairs of rolls for engaging the edge portions of the sheet between the bath and the drawing means, and means for driving the edge rolls in a reverse direction to the direction of travel of the glass to resist the movement of the glass sheet and stretch the same, substantially as described.

5. Sheet glass drawing apparatus, including a molten bath, a bending roll, means for engaging the edge portions of the sheet between the bending roll and the bath for drawing the edge portions upwardly, and means between such drawing means and the bath for frictionally applying a downward force to the rising sheet to resist the upward movement of the sheet and stretch the same, substantially as described.

6. Sheet glass drawing apparatus, including a molten bath, means for drawing a sheet of glass upwardly therefrom comprising means for gripping the edge portions of a rising sheet and drawing them upwardly, and means for frictionally engaging the edge portions of the sheet between the bath and the first gripping means and urging the same downwardly, substantially as described.

7. Sheet glass drawing apparatus, including a molten bath, edge rolls for engaging the edge portions of a rising sheet of glass and drawing the same upwardly, edge rolls between the first mentioned rolls and the bath for frictionally engaging the rising sheet, and means for positively driving the last mentioned rolls in a reverse direction to the direction of travel of the glass sheet, substantially as described.

8. Sheet glass drawing apparatus, including a molten bath, means for drawing a sheet of glass upwardly therefrom, a bending roll for altering the direction of travel of the glass sheet while it is still in a plastic condition, roll supports for supporting the glass sheet after it passes over the bending roll, and means for driving the roll supports at a higher peripheral speed than that of the bending roll, substantially as described.

9. Sheet glass drawing apparatus, including a molten bath, a bending roll adapted to change the direction of travel of a plastic glass sheet drawn from the molten bath, means between the bending roll and the bath for frictionally applying a downward force to resist the upward movement of the sheet and stretch the same, rollers for supporting the sheet after it passes over the bending roll, and means for driving the rollers at a higher peripheral speed than the bending roll to further stretch the sheet, substantially as described.

10. Sheet glass drawing apparatus, including a molten bath, a bending roll thereabove for changing the direction from the molten bath, means for engaging the edge portions of the glass sheet below the bending roll for drawing them upwardly, means between such drawing means and the bath for frictionally applying a downward force to the rising sheet to resist the upward movement of the sheet and stretch the same, rollers for supporting the glass sheet after it passes over the bending roll, and means for driving the rollers at a higher peripheral speed than that of the bending roll to further stretch the sheet, substantially as described.

11. Sheet glass drawing apparatus, including a molten bath, means for drawing a glass sheet upwardly therefrom, a pair of edge rolls between the drawing means and the molten bath for engaging an edge portion of the sheet, means for driving the edge rolls in a reverse direction to the travel of the glass, and means for adjusting the position of the roll, substantially as described.

12. Sheet glass drawing apparatus, including a molten bath, knurled rolls for engaging the edge portions of a glass sheet and assisting in drawing it upwardly therefrom, smooth rolls between the knurled rolls and the bath for resisting the upward movement of the sheet and stretch the same, means for driving the smooth rolls in a reverse direction to the direction of the travel of the glass, and means for adjusting the position of the smooth rolls, substantially as described.

13. Sheet glass drawing apparatus, including a molten bath, knurled rolls for engaging the edge portions of a glass sheet and assisting in drawing it upwardly from the bath, smooth rolls between the knurled rolls and the bath for frictionally engaging the sheet to resist its upward movement and stretch the same, means for driving the smooth rolls in a reverse direction to the direction of travel of the glass, and means for adjusting the position of the smooth rolls and the knurled rolls, substantially as described.

In testimony whereof I have hereunto set my hand.

WILLIAM L. MONRO.